United States Patent [19]

Fujita et al.

[11] Patent Number: 4,498,988
[45] Date of Patent: Feb. 12, 1985

[54] SCRAPING MECHANISM

[75] Inventors: Kiyoshi Fujita, Kobe; Shirou Toyohisa, Daido; Osamu Katou; Kenji Ishimaru, both of Kobe, all of Japan

[73] Assignee: Kabushiki Kaisha Kobe Seiko Sho, Kobe, Japan

[21] Appl. No.: 444,067

[22] Filed: Nov. 24, 1982

[30] Foreign Application Priority Data

Nov. 25, 1981 [JP] Japan .................. 56-189825

[51] Int. Cl.³ .............................. B01D 33/06
[52] U.S. Cl. ................................. 210/397; 210/393
[58] Field of Search ............... 210/396, 397, 393, 413, 210/414, 415

[56] References Cited

U.S. PATENT DOCUMENTS

| 1,922,959 | 8/1933 | Keasi et al. | 210/396 |
| 2,354,150 | 7/1944 | Skinner | 210/397 |
| 3,550,775 | 12/1970 | Cooler | 210/414 X |
| 4,151,094 | 4/1979 | Wyman | 210/396 |
| 4,273,655 | 6/1981 | Reid | 210/396 |

*Primary Examiner*—John Adee
*Attorney, Agent, or Firm*—Oblon, Fisher, Spivak, McClelland & Maier

[57] ABSTRACT

A scraping mechanism for scraping off deposit material from a surface of a moving body, including a scraper having a bladed edge at the fore end thereof, a mechanism for pressing the scraper against the surface of the moving body, and a mechanism for reciprocatingly driving the scraper on and along the surface of the moving body in parallel relation therewith.

4 Claims, 8 Drawing Figures

SCRAPING MECHANISM

BACKGROUND OF THE INVENTION

1. Field of the Invention

This invention relates to a mechanism for scraping off deposit material from the surface of a moving body such as a rotary drum, an endless filter cloth belt or the like.

2. Description of the Prior Art

As disclosed, for example, in U.S. Pat. Nos. 3,869,389; 3,699,881; 3,601,039; 3,478,888 and 1,415,859, conventional scrapers are provided with a scraping member which is fixedly or detachably attached to a support member to scrape off sludge or other deposit of processed material from the surface of a rotary drum or an endless filter cloth belt, keeping a constant distance from the surface of the drum or belt.

However, in a case where the processed material contains a large amount of foreign matter such as fiber, hair, paper, cloth or the like, a difficulty is often encountered in that the efficiency of the scraping operation is lowered considerably by the foreign matter which entangles around the blade of the scraper, forming space between the scraper blade and the surface of the rotary drum or the endless filter cloth belt.

For instance, in the case of a belt press type dehydrator which is employed for the treatment of sludge in a waste water treating process, there occurs the necessity of removing with a scraper the sludge which deposits on the surface of a filter cloth belt as a result of a dehydrating treatment. On such an occasion, the more the foreign material entangles around the scraper blade, the more the latter is spaced away from the surface of the filter cloth belt, inviting clogging of the filter cloth belt with the residual deposits which cause degradations in the operational efficiency of the dehydrator.

SUMMARY OF THE INVENTION

It is an object of the present invention to provide a scraper mechanism with eliminates the abovementioned drawback of the conventional scrapers.

It is a more particular object of the invention to provide a scraper mechanism which is particularly suitable for scraping off deposit material from the surface of a moving body such as a rotating drum of a rotary filter, an endless filter cloth belt of a belt press type dehydrator or the like.

According to the present invention, there is provided a scraping mechanism for scraping off deposit material from a surface of a moving body, comprising: a scraper having a bladed edge at the fore end thereof; means for pressing the scraper against the surface of the moving body; and means for driving the scraper reciprocatingly on and along the surface of the moving body in parallel relation therewith. With this arrangement, the deposit material is effectively scraped off by the pressing means, while the entangling foreign matter at the bladed edge of the scraper is detached therefrom by the reciprocating movement of the scraper which is imparted by the drive means. Preferably, the scraper is reciprocated at a speed higher than the travelling speed of the moving body to detach the entangling foreign matter from the scraper blade in a more effective manner.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Hereafter, the scraping mechanism of the present invention is described more particularly by way of some preferred embodiments shown in the accompanying drawings, which are applied to a belt press type dehydrating machine for the convenience of explanation.

Figure 1:
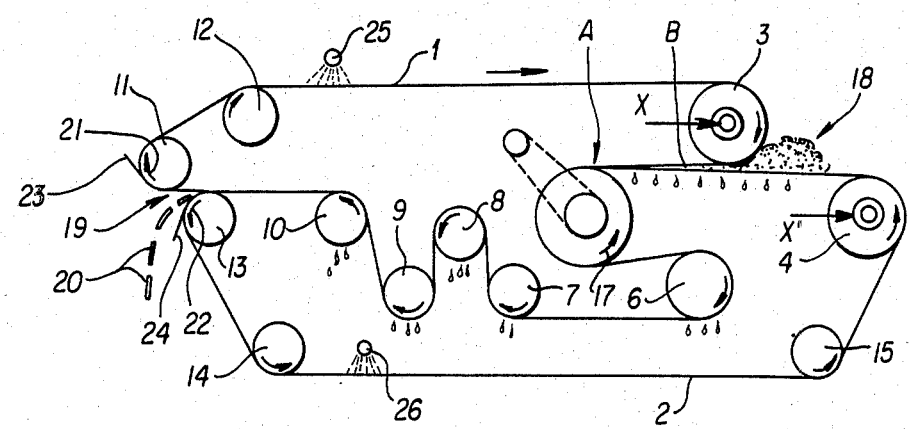
FIG. 1 is a schematic side view of a belt press type dehydrator.

Referring to FIG. 1, there is schematically shown a belt press type dehydrating machine with scrapers 23 and 24 provided at the sludge discharging end of upper and lower belts 1 and 2 which convey sludge 18 to the discharging end after compressive dehydration. With regard to the scrapers employed in the dehydrating machine of the first embodiment, reference is also had to FIG. 2 which shows one scraper in perspective view, FIG. 3 which shows the same scraper in side view, and FIGS. 4 and 5 which show in side views the blade portion of the scraper for the explanation of its operation.

Figure 2:
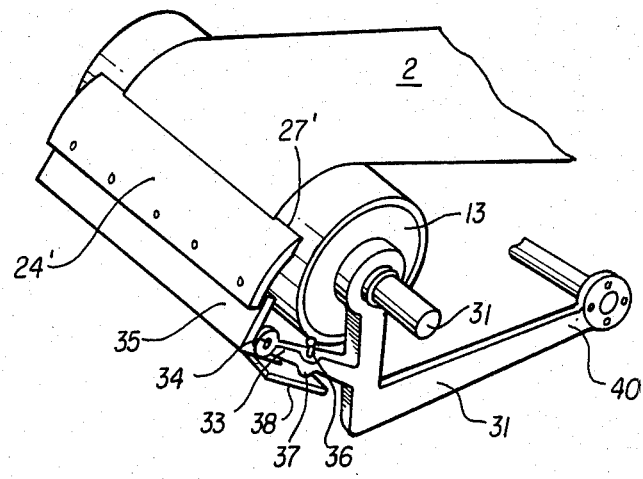
FIG. 2 is a perspective view of an embodiment of the scraper according to the present invention which is applied to a dehydrating machine.
Figure 3:
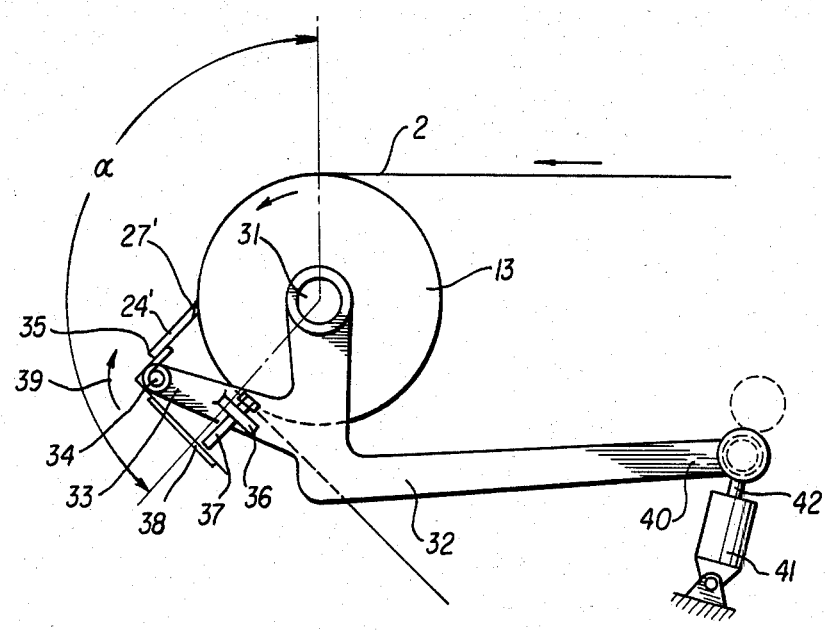
FIG. 3 is a schematic side view of the same scaper.

In FIGS. 2 and 3, indicated by reference number 2 is the lower belt which is lapped around a discharge roller 13 rotating about a shaft 31 and the lower belt is held in contact with the discharge roller over an angle α. Provided within the range of the contacting angle α is a scraper 24' which is pressed against the surface of the lower belt 2 and secured to an angular metal mounting piece 35 fixedly provided at one end 33 of a lever 32 which is rotatable about a horizontal shaft 34. The mounting piece 35 is constantly urged in the direction of arrow 39 by the cooperative action of a leaf spring 38 and a bolt 37 which is threaded through a lateral projection 36 of the lever 32 and engaged at its outer end with the leaf spring 38. The blade 27' of the scraper 24' is pressed against the surface of the belt 2 by the force of the leaf spring 38.

The other end of the lever 32 is pivotally connected to a piston rod 42 of a pneumatic or hydraulic piston-cylinder 41 which is mounted on a machine frame. Consequently, the fore end 40 of the lever 32 is moved up and down arcuately by the reciprocating movements of the piston of the fluid cylinder 41 with the blade 27' of the scraper 24' pressed against the wrapped portion of the discharge roller 13.

In this instance, in order to move the scraper 24' in the travelling direction of the lower belt 2, the speed of the piston motion of the fluid cylinder 41 is determined such that the scraper blade 27' moves along the lower belt 2 at a speed higher than the travelling speed of the lower belt 2.

In operation of the above-described embodiment, the upper and lower belts 1 and 2 are tensioned so as to be taut by urging tension rollers 3 and 4 in the direction of arrows X and X', respectively, and the roller 5 is driven from a motor 16 to rotate in the direction of arrow 17, whereupon the upper and lower belts are both moved in the direction of arrow 17. The moisture content in the concentrated sludge 18 which is fed onto the lower belt 2 at a position forward of an overlapped portion A of the upper and lower belts 1 and 2 permeates through the lower belt 2 and drops therefrom by gravity. In the next phase, the concentrated sludge 18 is fed into a wedge-like gap B formed between the tension rollers 3 and 4 and the drive roller 5 by the movement of the upper and lower belts 1 and 2. The concentrated sludge 18 is sandwiched between the upper and lower belts 1 and 2 are in repeatedly compressed and dehydrated as it is passed around the circumferences of squeeze rollers 6 to 10. The sludge which has been stripped of its moisture content in this manner is discharged from the machine in the form of dehydrated cakes 20 at the parting point 19 of the discharge rollers 11 and 13.

Figure 4:
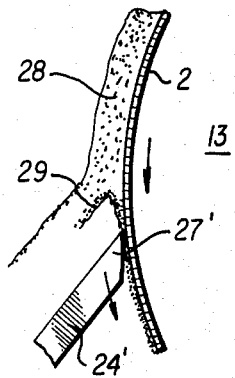
FIGS. 4 and 5 are schematic side views of the blade portion of the scraper, which are employed for explanation of the operation performed by the first embodiment of the invention.
Figure 5:
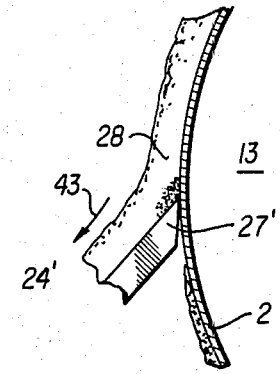

At this time, the dehydrated sludge 29 deposited on the lower belt 2 is scraped off by the scraper 24', while the fibrous foreign matter 29 entangling around the blade 27' of the scraper is pushed against the lower belt 2 and disengaged from the scraper blade 27' as shown in FIG. 4 as the scraper 24' is moved at a speed higher than the belt 2 in the travelling direction of the belt 2 with the blade 27' pressed thereagainst. In the next phase, the scraper 27' is moved in a direction opposite to the travelling direction of the belt 2 as shown in FIG. 5, so that the fibrous material which has been rubbed onto the belt 2 is scooped by the blade 27' and discharged in the direction of arrow 43 as shown in FIG. 5.

By the reciprocating movement of the scraper 24' the entangling foreign material is detached from the scraper to restore its normal scraping function. The above-described sequential operations can be performed automatically in response to signals from a timer or a counter of roller revolutions or other control means. Although the blade portion 27' of the scraper 24' is arranged to make arcuate reciprocating movements about the shaft 31 in the foregoing embodiment, the present invention is not limited to such arrangement and has other possibilities with regard to the fulcrum point of the scraper. Further, although the foregoing description has been directed to the scraper 24' which is associated with the outer periphery of the discharge roller 13, the same applies to the other scraper 23 which is associated with the discharge roller 11. These two scrapers may be either driven from separate drive sources or simultaneously driven from a common drive source through a suitable link mechanism.

Figure 6:
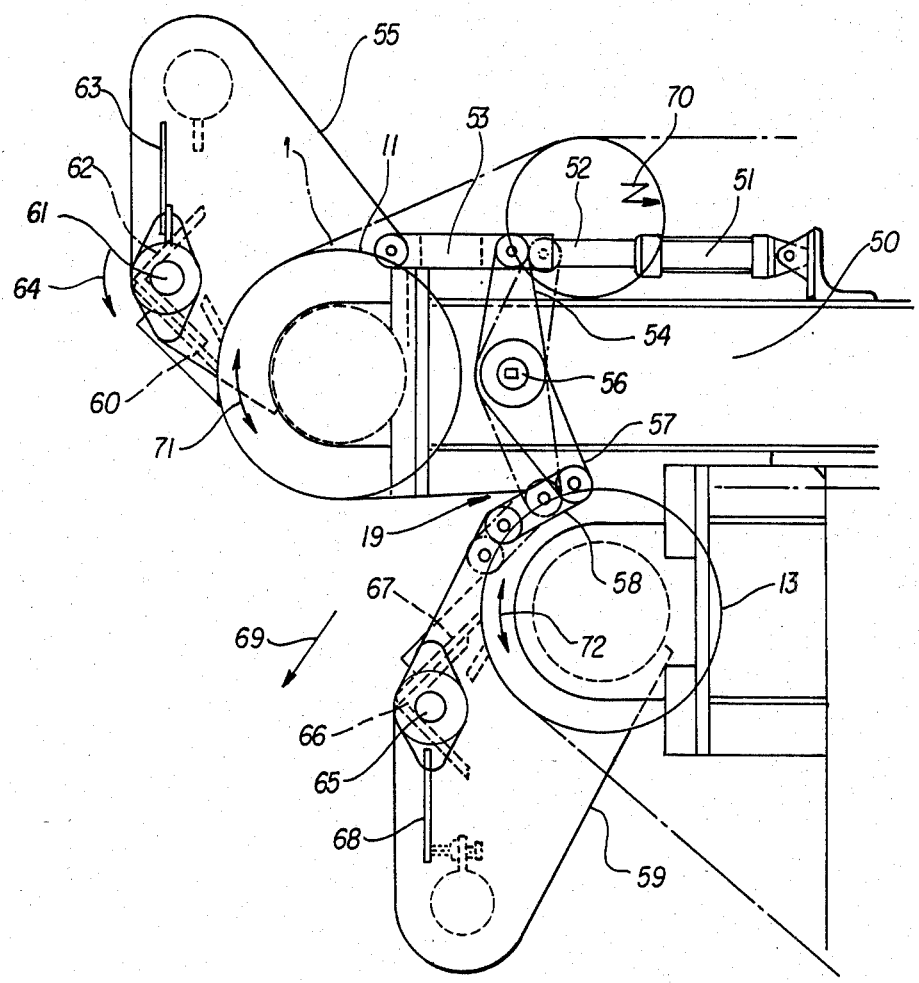
FIG. 6 is a schematic side view of a scraper portion of another embodiment of the invention which is also applied to a dehydrator.

FIG. 6 shows another embodiment of the invention, wherein a pair of scrapers which are connected by a link are simultaneously driven by a single pneumatic piston-cylinder. In this embodiment, the fore end of a piston rod 52 of a pneumatic piston-cylinder 51 which is mounted on a machine frame 50 is pivotally connected to a pair of links 53 and 54. The link 53 is pivotally connected to a lever 55 which is rotatable about the axis of the discharge roller 11, while the other link 54 is pivotable about a pin 56 which is fixed on the machine frame and has the opposite end 57 connected to a lever 59 which is rockable about the axis of the discharge roller 13. Designated by reference number 60 is a scraper which is securely fixed to a mounting piece 62 which is in turn securely fixed to the lever 55 for rocking movements about a shaft 61. The scraper 60 is pushed in the direction of arrow 64 by a bolt (not shown) acting on a leaf spring 63 which is fixed to the mounting piece 62, and pressed against the upper belt 1 which is wrapped around the discharge roller 11. On the other hand, a scraper 67 which is pressed against the lower belt 2 wrapped around the discharge roller 13 by a bolt (not shown) acting on a leaf spring 68 is secured to a mounting piece 66 for rocking movements about a shaft 65 which is fixedly secured to the lever 59.

The dehydrated cakes which are discharged from the parting point 19 of the upper and lower belts 1 and 2 are dropped in the direction of arrow 69.

In this embodiment, as the pneumatic cylinder 51 is operated telescopically as indicated by arrow 70, the lever 55 and the scraper 60 simultaneously undergo reciprocating arcuate movement as indicated by arrow 71 via the link 53. Similarly, the lever 59 and the scraper 67 which is attached to the lever 59 are reciprocated in the direction of arrow 72 via links 54 and 58.

Figure 7:
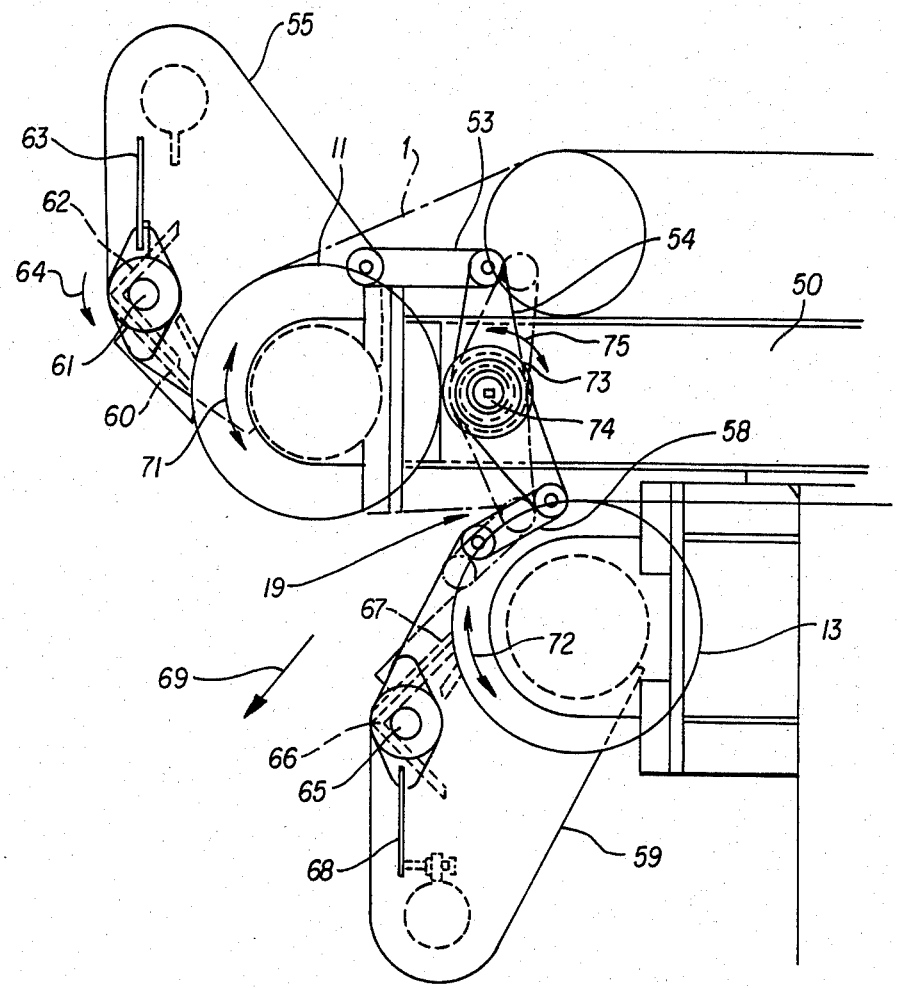
FIGS. 7 and 8 are a side view and a front, respectively, of a scraper portion of still another embodiment of the invention incorporated into a dehydrator.
Figure 8:
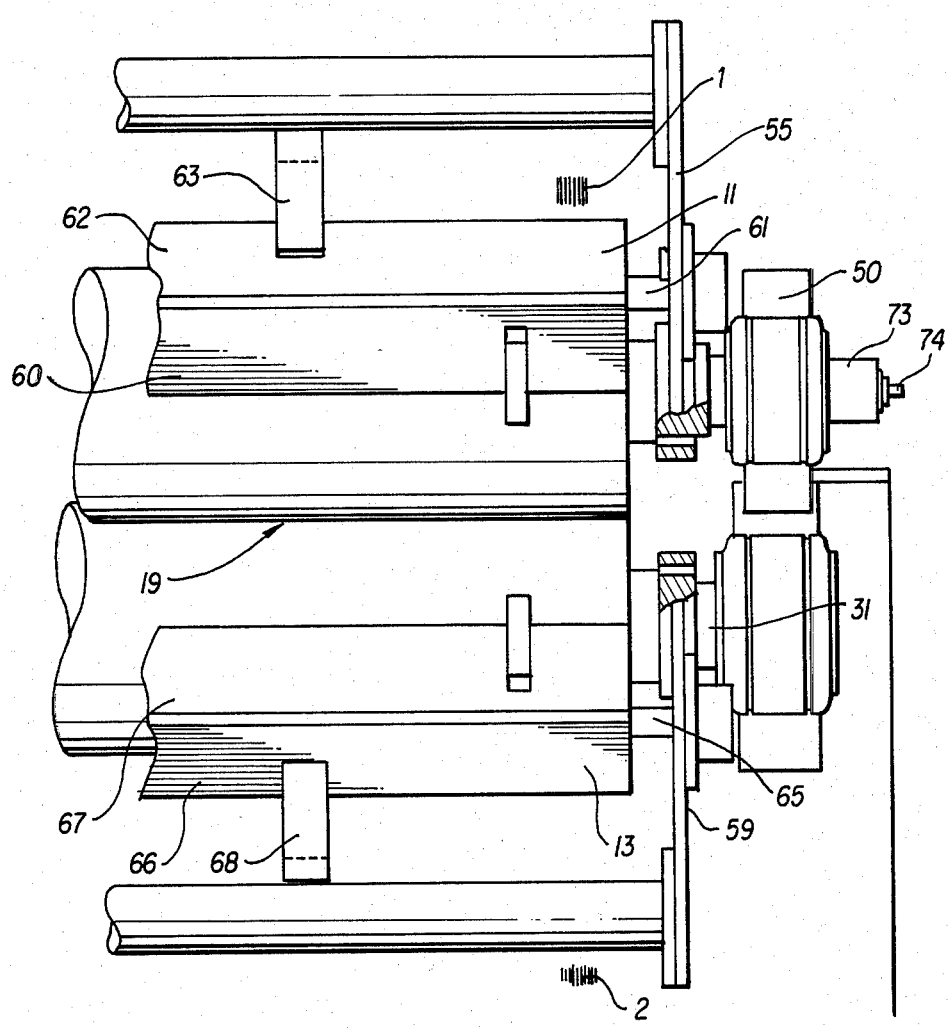

FIGS. 7 and 8 show in side and front views a further embodiment of the invention which is also applied to a dehydrating machine and in which instead of utilizing the pneumatic cylinder, an operating shaft 74 of a hydraulic rotary actuator 73 is securely fixed to the center of a link 54 to reciprocate the latter in the direction of arrow 75 directly by the operation of the rotary actuator 73, thereby rocking the levers 55 and 59 through links 53 and 58 which are pivotally connected to the opposite ends of the link 54 for imparting reciprocating movements to the scrapers 60 and 67, respectively.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent is:

1. A scraping mechanism for scraping off deposit material from a surface of a moving body, comprising:
   a scraper having a bladed edge at a fore end portion thereof;
   means connected to said scraper for pressing said scraper against the surface of said moving body; and
   means operatively associated with said scraper for driving said scraper reciprocatingly on and along the surface of said moving body in parallel relation therewith, for detaching an entangling foreign material from said scraper and for restoring a normal scraping function to said scraper wherein said means for driving said scraper further comprises means for driving said scraper in a direction of travel of said moving body at a speed higher than said moving body and for then returning said scraper to an initial position.

2. A scraping mechanism as set forth in claim 1, wherein said means for driving said scraper further comprises a pneumatic piston-cylinder and a link mechanism operatively associated with said cylinder for transmitting movement of said piston-cylinder to said scraper.

3. A scraping mechanism as set forth in claim 1, wherein said means for driving said scraper further comprises a hydraulic rotary actuator and a link mechanism operatively associated with said actuator for transmitting movement of said rotary actuator to said scraper.

4. The scraping mechanism as set forth in claim 1, wherein said means for driving said scraper further comprises means for driving said scraper arcuately and reciprocatingly on and along the surface of said moving body.

* * * * *

UNITED STATES PATENT AND TRADEMARK OFFICE
CERTIFICATE OF CORRECTION

PATENT NO. : 4,498,988
DATED : February 12, 1985
INVENTOR(S) : FUJITA ET AL

It is certified that error appears in the above-identified patent and that said Letters Patent is hereby corrected as shown below:

Column 1, line 40 change "with" to --which--.

Signed and Sealed this

Ninth Day of July 1985

[SEAL]

*Attest:*

DONALD J. QUIGG

*Attesting Officer*  *Acting Commissioner of Patents and Trademarks*